June 2, 1953  F. W. SLACK  2,640,728
WHEEL STRUCTURE
Filed Dec. 26, 1950
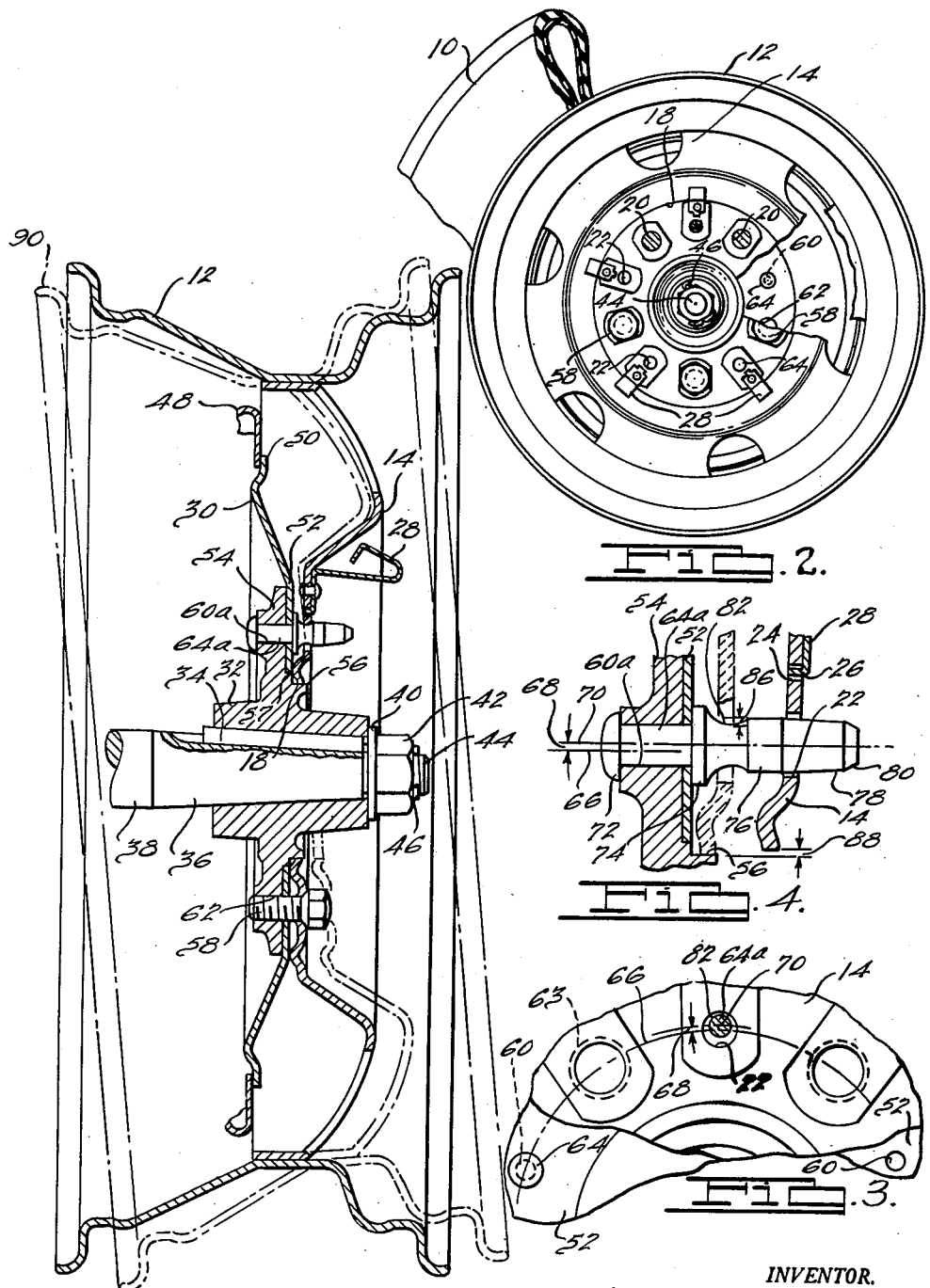
INVENTOR.
Frederic W. Slack.
BY
Harness and Harris
ATTORNEYS.

Patented June 2, 1953

2,640,728

UNITED STATES PATENT OFFICE 2,640,728

WHEEL STRUCTURE

Frederic W. Slack, Detroit, Mich., assignor to Chrysler Corporation, Highland Park, Mich., a corporation of Delaware Application December 26, 1950, Serial No. 202,745

6 Claims. (Cl. 301—9)

This application relates to a pilot stud for guiding a wheel onto a hub, and more particularly to a pilot stud having a depressed portion and a retaining shoulder thereadjacent for facilitating the retention of an automobile road wheel in centered position relative to the hub assembly upon which the stud is carried. The stud is so positioned as first to receive the wheel guide opening when the wheel is not concentric with the hub and then, when the guide opening is made to ride over the stud and into the depression, secondly to guide the wheel into a centered position satisfactory for the employment of the wheel bolts. During the time in which an operator is applying the wheel bolts, the stud-retaining shoulder serves the operator to help prevent the wheel from slipping off the stud and in a novel manner set forth hereinafter in greater detail.

According to a feature of the present invention, a pilot stud is provided for a stepped hub adapted to receive a wheel opening therearound with the edges of the opening so engaging the step that it is held against any transverse shift with respect thereto, the pilot stud being formed with a depression for receiving an edge of a wheel guide opening and affording a pivotal point about which the wheel may swing toward the plane of the hub into a concentric relationship wherein the wheel hub opening swings over the hub step with the desired results.

According to a further feature of the invention, in a hub for receiving a wheel having a ring of openings, provision is made to employ a similar ring of hub bores which register with the wheel openings and provision is at the same time made to locate a shouldered wheel pilot stud on the hub in a slightly offcenter position relative to the center of the bore ring path such that the wheel is initially guided into an offcenter position when its guide opening receives the stud. A depression in the stud permits the wheel to be shifted into an on-center position, and thereafter the shoulder on the stud bordering the depression prevents axial displacement of the wheel so long as the wheel remains on center with respect to the hub.

According to still a further feature, the improved wheel guide pilot stud helps to provide for the retention of the road wheel in place while the wheel bolts are being applied, and in the usual circumstance, without the need of any attention or assistance from the operator who is thus rendered free to use both hands in starting the wheel bolts and devoting his entire attention otherwise than to steadying the road wheel or preventing it from falling off the wheel supporting hub. Though the invention specifically offers the foregoing advantage of freeing the operator from having to steady the wheel while bolting it into place, it may be found under certain circumstances that the steadying influence of the operator's hand may be desirable to the extent that some slight manual pressure can be supplementally employed to effect in holding the wheel temporarily snug against the hub, especially when the vehicle is substantially tilted in the direction of the operator.

Other features, objects and advantages will either be specifically pointed out or become apparent when reference is made to the following detailed specification taken in conjunction with the accompanying drawings in which:

Figure 1 is a sectional view of a hub assembly and road wheel;

Figure 2 is a face view of the hub and wheel of Figure 1;

Figure 3 is a fragmentary enlargement of the face view of Figure 2; and

Figure 4 is a section through the flanged structure of the hub and wheel adjacent the rivet providing a pilot stud for the wheel.

In the drawing, a pneumatic tire 10 is mounted to a road wheel having a rim 12 carried by a radiating flange or web 14 in the center of which is formed a hub-receiving opening 18. A ring of openings is provided in the wheel flange circumferentially spaced about the hub opening 18 and is composed of alternating, radially aligned, bolt-receiving openings 20 and wheel guide openings 22. Conventionally, five openings of each type are provided in the wheel flange. Paired with each wheel guide opening 22 and disposed generally radially outwardly thereof is a narrow slot 24 which may or may not extend into the wheel guide opening. Slot 24 serves to receive a tang 26 of one of a plurality of spring clips 28 riveted to the wheel flange. The spring clips 28 cooperatively serve to secure a hub cap or wheel cover, not shown, to the wheel flange. The road wheel is mounted to a drum or hub assembly comprising a drum section 30 and a hub section 32. Hub section 32 is keyed at 34 to the tapered portion 36 of an axle 38. The present showing of axle 38 is more or less conventional for rear vehicle wheels, the key 34 serving to prevent relative rotation as between hub 32 and a rotatable axis 38.

The present invention applies equally as well to front steerable wheels, the difference between such wheels and a rear wheel as shown, residing largely in the matter of relative rotation between the hub and the tapered portion 36. In a front wheel the tapered portion 36 is ordinarily a nonrotatable steering knuckle, between the hub and which is provided a set of bearings to permit rotation of the hub relative to the tapered portion 36. In either case, one of which is equivalent to the other for purposes of the present invention, the hub is conventionally retained to the tapered portion 36 by a washer 40 and a nut 42 threadably received on a reduced threaded portion 44 integral with tapered portion 36, and the nut is retained thereon by a cotter pin 46.

Drum section 30 has a generally cylindrical portion 48 serving as a brake drum and overlapping as at 40 with a radiating flange portion 52 of the drum section 30. Hub section 32 has radiating flange structure 54 also overlapping radiating flange 52. Radiating flange 52 has an inner margin 57 terminating generally adjacent a stepped annular hub portion 56 providing an annular shoulder on the hub 32. The wheel flange is secured to the hub assembly by a plurality of fasteners 58 which may be bolts. The overlapping radiating flange structures 52 and 54 are provided with a ring of radially aligned openings comprising bolt-receiving bores tapped as at 62 alternating with rivet-receiving openings 60, each type opening preferably being of the number five. Fasteners 58 are received in the tapped bores 62, and rivets 64 are received in the alternate rivet-receiving openings 50 in order to hold together the flange structures 52 and 54. A mean circumference 66 of the ring of hub assembly openings will be seen to pass through the center of the rivet-receiving openings and the bolt-receiving bores 62 as well. Although rivet-receiving openings 60 are generally radially aligned, at least one rivet-receiving opening 60$^a$ is radially offset with respect to the named mean circumference by a dimension indicated at 68. A special rivet member 64$^a$ received in the offset opening 60$^a$ has a flattened head 72 cooperating on one side of flange structure 54 and a widened shank portion 74 held against the drum section flange 52. Rivet member 64$^a$ is formed to provide a pilot stud integral with portion 74 comprising a generally cylindrical portion 76, a slightly tapered portion 78, and a beveled portion 80. Portion 74 adjacent flange 52 provides a depression 82 which may be formed by providing an annular groove about the base of the shank 74. The depression 82 has a depth dimension 86 substantially equal to the offcenter dimension 68 of the center line of the special rivet member 64$^a$ to the mean circumference line 66 for the rest of the rivets.

Installation of the wheel is accomplished as follows. The bolt-receiving bores of the hub assembly and the bolt-receiving openings in the wheel flange are adapted to register when the wheel and hub are concentric. However, since the pilot-stud-providing rivet member 64$^a$ is slightly eccentric or offcenter with respect to the path of the ring of wheel guide openings and rivet member openings, the wheel is first guided toward the hub in an offcenter relation. Preferably the hub has previously been rotated such that the pilot stud providing rivet member is uppermost relative to the other rivet members. The wheel is brought toward the hub in the described slightly offcenter relationship such that the beveled portion 80 of the pilot stud passes through the one of the five wheel guide openings 22 which is uppermost. As the wheel is advanced slightly offcenter in the direction of the hub and in a position tilted slightly toward the stud, the margin of opening 22 slides over the pilot stud and rides down into the depression 82 formed by the annular groove around the shank of the stud. The wheel being tilted slightly, the edge of the guide opening is allowed to drop down into the depression 82 such that the wheel assumes a position indicated at 90 in Figure 1. The dimension of the depression 82, indicated at 86, is substantially equal to the amount that the opening 60$^a$ is offcenter relative to the mean circumference 66 of the remaining rivet members. When the guide opening rides into the depression 82, the rim of the wheel hub opening 18 may move a distance indicated at 88 so as to register with and clear the annular stepped portion 56 of hub 32.

Hence from the dotted line position 90, the wheel may be rocked toward the plane of the hub into the full line position of Figure 1 wherein the annular stepped portion 56 provides a shoulder holding the margins of hub opening 18 against transverse shift relative thereto. In the full line position shown in Figure 1, the shoulder provided by cylindrical portion 76 on the stud providing rivet member 64$^a$, serves as a retaining shoulder adjacent depression 82 to prevent the wheel from being removed from the hub assembly without tilting the wheel and moving the wheel to a non-concentric relation relative to the hub.

It will be appreciated then that the operator who is changing the wheel and mounting it to the hub, can with the help of the wheel retaining shoulder on the pilot stud maintain the wheel in place without fear of the wheel slipping off the wheel-mounting hub. Under the usual circumstances, the mounting hub and the mounted wheel cooperate to produce a self-retaining assembly of themselves independently of and during application of the more permanent wheel attaching bolts. The dotted showing in Figure 1 of web 14 best illustrates the intimate association self-maintained between wheel flange and hub assembly during the interval in which the wheel bolts are applied. The wheel is thus supportingly hung in position leaving the operator free to manipulate the attaching bolts without danger of the wheel falling from its dotted illustrated position. It may happen, for instance as occasioned by unusual circumstances such as unusual tilt of the vehicle, that the operator who is mounting the road wheel may want to steady the wheel with his hand and supplement the self-retaining action of the assembly in preventing any wobbling or swinging of the wheel and slight manual pressure may be used if desired, but ordinarily according to the invention the wheel may be left to itself while the bolts are initially applied and their threads are started.

As herein disclosed, the invention is shown embodied in a hub or drum assembly in which the bolt-receiving bores and rivet openings are generally radially aligned and all in conformity with the similar disposition of the radially aligned bolt-receiving and guide openings of a usual road wheel. It is evident that the radial alignment of the alternating openings on either hub or wheel member depends only upon whether or not the alternating openings of the other member are radially aligned and the alternate openings on both members could equally well be disposed along two different rings, each of which corresponds in dimensions to one ring on the other member. Indeed, it is not essential to the invention that the hub rivet-opening-ring and the wheel guide opening ring correspond at all so long as the opening for the pilot stud providing rivet is slightly radially offset with respect to the mean circumference of the ring of wheel guide openings when the wheel is concentric with the hub. So also the drawing shows the radial offset of the opening for the pilot stud providing rivet to be an outward offset but self-evidently the offset of the named opening could be provided to the same advantage in the form of a radially inward offset and the effective depression in the shank of the stud providing rivet would of necessity extend outwardly toward the mean circumference of the ring of rivet opening rather than radially inwardly as shown in Figure 3.

Variations within the spirit and scope of the invention described are equally comprehended by the foregoing description.

What is claimed is:

1. For use with a road wheel having a central hub opening and a ring of a radially aligned plurality of openings in spaced adjacency to the hub opening and composed of alternate bolt openings and guide openings, a brake drum assembly including a drum and a hub therefor, said hub presenting an annular shoulder receivable in said wheel hub opening and a radiating flange, said drum having a flange radially overlapping said hub flange and both said flanges being apertured with a ring of openings generally corresponding in number and disposition to one another and to the ring of wheel openings, and rivet members passing through alternate openings in said hub and riveting the drum thereto through the corresponding drum openings, the remainder of said openings being adapted to receive wheel bolts, at least one of said alternate openings being radially offset with respect to a mean radius of the ring of drum assembly openings and the rivet members therein providing an annularly grooved pilot stud receivable in a said wheel guide opening and permitting the edge of the said opening to ride into the annular groove to allow the wheel to center itself relative to the annular shoulder of the hub.

2. For use with a bolt-attached road wheel having a hub opening and a ring of radially aligned openings therearound alternating ones of which are bolt-receiving openings and guide openings respectively, in combination, a drum assembly having a hub and radially extending structure adapted with a ring of tapped bores to receive wheel bolts through the bolt-receiving wheel openings, said drum assembly being provided with a plurality of rivet-receiving openings generally conforming to the path of revolution of said ring of the tapped bores and alternating with the latter, one of said rivet-receiving openings being radially offset a predetermined dimension from a mean radius of said ring path of revolution, and a plurality of rivet members riveted into the rivet-receiving openings with the rivet in said one opening providing an upstanding pilot stud formed with a transversely disposed depression, said depression extending in the direction of a mean circumference of said ring path of revolution and being of a depth of substantially said predetermined dimension to permit a said wheel guide opening to ride over the pilot stud and into the depression therein for centering the hub opening of the wheel with respect to the drum assembly hub.

3. For use with a bolt-attached road wheel having a hub opening and a ring of radially aligned openings therearound alternating ones of which are bolt-receiving openings and guide openings respectively, in combination, a drum assembly having a hub and radially extending structure adapted with a ring of tapped bores to receive wheel bolts through the bolt-receiving wheel openings, said drum assembly being provided with a plurality of rivet-receiving openings generally conforming to the path of revolution of said ring of the tapped bores and alternating with the latter, one of said rivet-receiving openings being radially offset a predetermined dimension from a mean radius of said ring path of revolution, and a plurality of rivet members riveted into the rivet receiving openings with the rivet in said one opening providing an upstanding pilot stud formed with a transversely disposed depression presenting a retaining shoulder, said depression extending in the direction of a mean circumference of said ring path of revolution and being of a depth of substantially said predetermined dimension to permit a said wheel guide opening to ride over the pilot stud and into the depression therein for centering the hub opening of the wheel with respect to the drum assembly hub and centering the bolt-receiving openings of the drum assembly and wheel relative to each other, said retaining shoulder preventing removal of said wheel from said drum assembly while centered with respect thereto.

4. For use with a road wheel having a hub opening and a ring of alternating bolt and wheel guide openings therearound, a hub assembly including a hub receivable in said wheel hub opening and having structure radiating therefrom, means forming a ring of wheel bolt bores in said radiating hub assembly structure and corresponding in radial dimensions to the path of revolution of said ring of wheel bolt openings, and means forming a wheel guide on the hub assembly in the general path of revolution of said wheel bolt bores, said guide including a pilot stud receivable in a wheel guide opening and being predeterminedly radially offset with respect to a mean circumference of the path of revolution of said wheel bolt bores, said pilot stud having a depression on the side thereof most remote to said mean circumference and into which the edge of the wheel guide opening may ride for centering the wheel with respect to the hub assembly.

5. For use with a road wheel having a hub opening and a ring of alternating bolt and wheel guide openings therearound, a hub assembly including a hub receivable in said wheel hub opening and provided with a portion transversely engageable with the edges of the hub opening to retain the wheel and hub in centered relation, and having structure radiating therefrom, means forming a ring of wheel bolt bores in said radiating hub assembly structure and corresponding in radial dimensions to the path of revolution of said ring of wheel bolt openings, and means forming a wheel guide on the hub assembly in the general path of revolution of said wheel bolt bores, said guide including a pilot stud receivable in a wheel guide opening and being predeterminedly radially offset with respect to a mean circumference of the path of revolution of said wheel bolt bores, said pilot stud having a depression on the side thereof most remote to said mean circumference and into which the edge of the wheel guide opening may ride for centering the wheel with respect to the hub assembly, and causing the transverse engagement aforesaid between the hub portion and edges of the hub opening of the road wheel.

6. In a hub assembly for use with a disc wheel adapted to be mounted on said hub assembly and having a ring of alternating bolt-receiving and pilot-hole openings therein disposed in a common path of revolution, the combination of a hub section having radiating flange structure and a stepped annular portion at a relatively inner region of the flange structure, said flange structure being provided with a ring of bolt-receiving bores disposed in a path of revolution surrounding said annular portion and corresponding to said wheel common path of revolution aforesaid, said bolt-receiving openings and said bolt-receiving bores being registerable with one another, a drum section having a flange overlapping the flange structure of the hub section to a point in closely spaced adjacency to the stepped annular portion thereof and formed with a ring of bolt openings in registry with said bores, and means connecting the overlapping portions of the flanges including a rivet member providing an upstanding stud disposed offcenter with respect to a mean circumference of the bolt ring path of revolution, said rivet member being formed with an annular groove around the shank of the stud and of a depth substantially equal to the amount that the stud is offcenter to the mean circumference aforesaid, said stud shank receiving in the annular groove thereof the edge of one of said wheel pilot-hole openings when the wheel is in a lean-to position with respect to said hub assembly, and upon relative elevation of said assembly to an aligned position with said wheel causing the wheel to be pulled onto said hub assembly into concentric relationship therewith.

FREDERIC W. SLACK.

References Cited in the file of this patent

UNITED STATES PATENTS

| Number | Name | Date |
|---|---|---|
| 1,624,356 | Nelson | Apr. 12, 1927 |
| 1,815,821 | Baker | July 21, 1931 |
| 2,107,925 | Ash | Feb. 8, 1933 |

FOREIGN PATENTS

| Number | Country | Date |
|---|---|---|
| 32,636 | France | Oct. 4, 1927 |
|  | (Addition to 617,253) | |
| 617,253 | France | Nov. 19, 1926 |